United States Patent [19]

Barnell et al.

[11] Patent Number: 4,813,540

[45] Date of Patent: Mar. 21, 1989

[54] HIGH IMPACT STRENGTH PROTECTIVE SEALS FOR TAPE REELS

[75] Inventors: Anthony J. Barnell, Liverpool; James J. Palmer, Cazenovia, both of N.Y.

[73] Assignee: Concept Plastics Corp., Syracuse, N.Y.

[21] Appl. No.: 82,051

[22] Filed: Aug. 5, 1987

[51] Int. Cl.⁴ ............................................. B65D 85/67
[52] U.S. Cl. ...................................... 206/400; 206/459
[58] Field of Search ............... 206/400, 398, 399, 401, 206/402, 459

[56] References Cited

U.S. PATENT DOCUMENTS

| | | |
|---|---|---|
| 2,598,192 | 5/1952 | Poust . |
| 3,156,353 | 11/1964 | Harnish . |
| 3,311,228 | 3/1967 | Kulka . |
| 3,525,427 | 8/1970 | Kulka . |
| 3,667,595 | 6/1972 | Posso . |
| 3,696,935 | 10/1972 | Dean . |
| 3,833,114 | 9/1974 | Osojnak . |
| 3,939,977 | 2/1976 | Price . |

Primary Examiner—Joseph Man Fu Moy
Attorney, Agent, or Firm—D. Peter Hochberg; Mark M. Kusner; Louis J. Weisz

[57] ABSTRACT

A high impact strength protective seal for packaging reels of magnetic tape, cinematographic film or the like and for storing them in a suspension type storage cabinet has been developed. The seal is of a single piece design, i.e., a molded unitary locking mechanism and annular band, as opposed to the more conventional two piece design of sealing rings for tape reels of the prior art. The protective seal is prepared by injection molding the seal flat from a thermoplastic material. The design of the seal and its locking mechanism allows for the seal to be adjustable in order to accommodate variations in the take up on a particular reel or in variations from reel to reel.

17 Claims, 2 Drawing Sheets

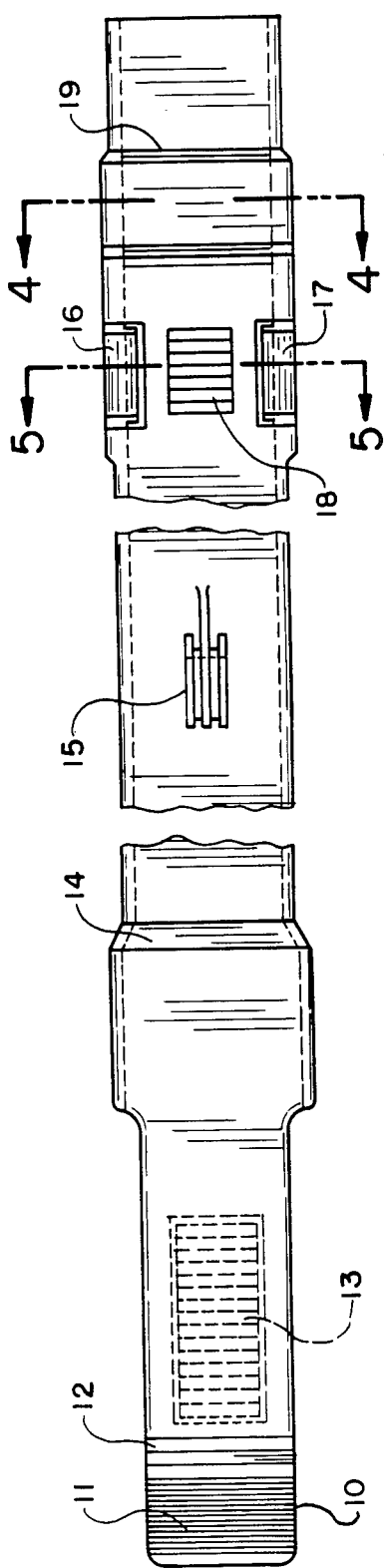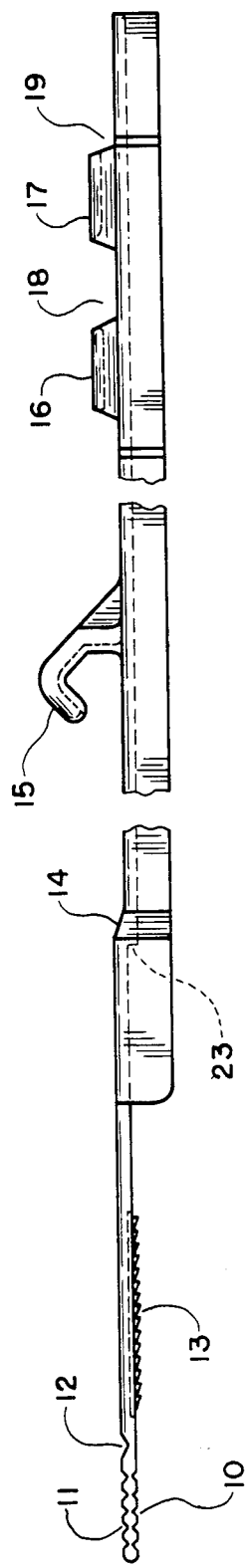

HIGH IMPACT STRENGTH PROTECTIVE SEALS FOR TAPE REELS

BACKGROUND OF THE INVENTION

1. Field of the Invention

This invention relates generally to a molded unitary protective seal for tape reels. More specifically, the invention relates to a seal comprising an annular band and locking means having high impact strength for use with computer tape reels and the like, and to the method for making such a seal.

2. State of the Art

Various forms of sealing rings for computer tape reels are presently available. Certain of these rings, while generally satisfactory in performance and durability, are relatively expensive. Others, while relatively inexpensive, provide minimal protection for the reel contents and are susceptible to excessive wear and breakage. Moreover, many of these sealing rings may be produced, only by multiple step extrusion molding processes.

Such sealing rings, protective seals and the like are described for example, in U.S. Pat. No. 2,598,192, which discloses a protective cover for frangible disks. The securing strip is secured by means of an adhesive coating on one side of the strip.

U.S. Pat. No. 3,156,353 discloses a closure for magnetic tape reels. The closure has a locking means which comprises a lever mounted on a fulcrum where a portion of the lever overlaps and contacts the other end of the closure band encircling the reel.

In U.S. Pat. Nos. 3,311,228 and 3,525,427, protective closures for tape reels, which may be applied to the flanges of the reel to close the space between the flanges and protect the tape wound thereon, are disclosed.

U.S. Pat. No. 3,667,595 discloses a device for packaging magnetic tape, cinematographic film or the like. The device comprises an open annular band and a locking member connecting the ends of the band.

U.S. Pat. No. 3,696,935 also discloses a reel sealing and storage device that comprises an elongated flexible band provided with a latching means. The latching means is comprised of two basic components assembled in a releasable manner such that the latch is provided with a centering tang for mating with guide legs on one band end.

U.S. Pat. No. 3,833,114 discloses a sealing ring for use with a computer tape reel that comprises a stiff arcuate portion for coaction with an overcenter latch assembly to seal the ring about the reel.

U.S. Pat. No. 3,939,977 discloses a sealing ring for computer tape reels. The sealing ring comprises a molded unitary strip of homogenous plastic material and an overlapping latch mechanism which comprises a latching finger projecting radially inwardly from the radially inner surface of the latch portion for coacting with a latching aperture provided in the overlapped end portion.

None of the foregoing disclosures provide a tape reel seal exhibiting high impact strength in combination with the features of an easily adjustable seal to accommodate variations in take up reels and is of a single piece design that may be injection molded flat.

SUMMARY OF THE INVENTION

A high impact strength protective seal for reels used with magnetic tape, cinematographic film or the like has been developed.

The seal according to the present invention is of a single piece design, i.e., a molded unitary locking means and annular band, as opposed to a two piece design of many of the seals for tape reels presently in the market place.

Further in accordance with the present invention, the seal is adjustable to accommodate variations in the take-up of the reels or variation from reel to reel.

Still further in accordance with the present invention, the seal comprises a locking means comprising a plurality of serations on both end portions of the annular band and a pull tab release, on one of the end portions.

Still further in accordance with the present invention, the seal may be prepared by injection molding flat a thermoplastic material.

Still further in accordance with the present invention, a portion of the annular band of the seal is provided with a ribbed hook that gives added strength for hanging the reel over long periods of time.

Still further in accordance with the present invention, a protective seal for tape reels is provided that contains an identification insert for addresses, logos and the like.

Still further in accordance with the present invention, a protective seal for tape reels is provided with bar coding that is readable by optical scanners.

Still further in accordance with the present invention, a protective seal for tape reels that may be produced in a variety of colors and that is stabilized against ultraviolet light is provided.

Still further in accordance with the present invention, a high impact strength protective seal for reels of the type including a central hub and spaced flanges is provided, said seal comprising a molded unitary locking means and an annular band of high tensile strength and high flexual modulus thermoplastic material adapted to be formed into a loop to sealingly encircle said reel comprising:

a first end portion comprising a plurality of narrow angle notches on both sides of said first end portion to form a tab for gripping said first end portion;

sealing means located on the hub side of said first end portion spaced from said tab away from the tip of said first end portion;

a second end portion adapted to underlap said first end portion in a sealing relationship, said second end portion comprising a sealing means on the side of said strip away from said hub and spaced from the tip of said second end portion adapted to adjustably seat with said sealing means on the hub side of said first end portion and to provide for a tight seal around said reel.

Still further in accordance with the present invention, a locking and releasing means is provided for a protective seal for reels of the type including a central hub and spaced flanges, said locking and releasing means comprising: a first end portion comprising a plurality of narrow angle notches on both sides of said first end portion to form a tab for gripping said first end portion; sealing means located on the hub side of said first end portion spaced from said tab away from said first end portion; and, a second end portion adapted to underlap said first end portion in a sealing relationship, said second end portion comprising sealing means on the side of said strip away from said hub and spaced from the tip of said second end portion adapted to adjustably seat with said sealing means on the hub side of said first end portion and to provide for a tight seal around said reel.

Still further in accordance with the present invention, a method for manufacturing a high impact strength protective seal for reels of the type including a central hub and spaced flanges is provided, said method comprising injection molding a thermoplastic material flat to produce a molded unitary protective seal comprising a locking means and an annular band wherein said locking means comprises: a first end portion comprising a plurality of narrow angle notches on both sides of said first end portion to form a tab for gripping said first end portion;

sealing means located on the hub side of said first end portion spaced from said tab away from said first end portion; and, a second end portion adapted to underlap said first end portion in a sealing relationship, said second end portion comprising sealing means on the side of said strip away from said hub and spaced from the tip of said second end portion adapted to adjustably seat with said sealing means on the hub side of said first end portion and to provide for a tight seal around said reel.

These and other aspects of the invention will become clear to those skilled in the art upon the reading and understanding of the specification that follows.

BRIEF DESCRIPTION OF THE DRAWINGS

FIG. 1 is a side view of one embodiment of the protective seal in accordance with the present invention.

FIG. 2 is a top view of one embodiment of the protective seal in accordance with the present invention.

Figure 3:
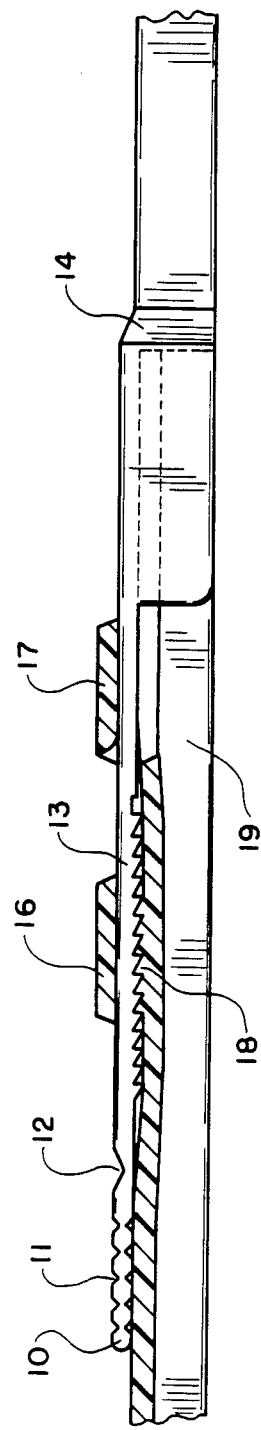
FIG. 3 is a side view of one embodiment of the locking mechanism in the locked position for the protective seal in accordance with the present invention.

The invention will be further described in connection with the attached drawing figures showing preferred embodiments of the invention including specific parts and arrangements of parts. It is intended that the drawings included as a part of this specification be illustrative of the preferred embodiment of the invention and should in no way be considered as a limitation on the scope of the invention.

DETAILED DESCRIPTION OF THE PREFERRED EMBODIMENTS

The protective seal developed in accordance with the present invention has several advantages over seals presently available in the marketplace and as previously described. The seal is of a single piece design as opposed to the two piece design of many of the seals for tape reels that are now commercially available. More specifically, the seal is a molded unitary locking means and annular band which is derived from high tensile strength and high flexural modulus thermoplastic material. The seal is adapted to be formed into a loop to sealingly encircle the reel to protect and tightly seal the tape or film contained on the particular reel. The reel is of the type which generally includes a central hub and spaced flanges upon which magnetic tape, such as the type used with various computer systems to store data and other information, or cinematographic film and the like is wound.

The thermoplastic material used to prepare the protective seal of the present invention is preferably material which has high tensile strength and high flexual modulus. Such thermoplastic material includes high density or low density polyethylene, high density or low density polypropylene, polyester and polyvinyl chloride. Preferred thermoplastic material useful for the present invention includes high density or low density polyethylene, and high density or low density polypropylene. The most preferred thermoplastic material for the purpose of the present invention is low density polyethylene.

Another advantage of the seal according to the present invention is that it may be prepared in a generally flat configuration by injection molding process as opposed to preparation by various extrusion molding processes by which the seals of the prior art are generally prepared.

The seal of the present invention also has a locking mechanism which is of such design to allow for easy release or sealing of the protective seal as well as providing the capability for adjustment of the locking mechanism to accommodate the variations in the take up of a particular reel or variations that occur from reel to reel. Thus, the seal gives a snug or tight fit around the reel to produce the desired protective barrier to keep foreign contamination from entering and keeps the magnetic tape or film tightly wound about the reel.

The locking mechanism of the present invention contains a pull tab release and preferrably serations on each of the two end portions of the seal where the serations are angled away from the tip of the two end portions of the seal. The seal is locked or sealed by overlapping the tab containing end portion with the opposite end portion of the seal and seating the seration containing portion of the seal. The serations on the underlapping portion of the seal are bordered by side walls and these side walls contain a lip to receive and contain the opposite end portion of the seal when locking the seal by the seating of the two seration containing portions of the seal. While serations on the two end portions of the seal are the preferred locking mechanism, other similar type locking mechanisms may be utilized, e.g., velcro strips, button snaps and the like.

One of the more important advantages of the seal designed according to the present invention and its method of preparation is that the seal has high impact strength, particularly compared to seals or sealing rings of the prior art. The seal of the present invention will not break when subjected to a three foot drop test. This, of course, is quite critical since the accidental dropping of the reel containing magnetic tape and the breaking of the seal could result in damage to the tape and the loss of important data or the damage and loss of cinematographic film footage.

Another benefit that the protective seal according to the present invention has over similar seals of the prior art is its very favorable economics due to the single piece design of the protective seal combined with the fact that it can be produced by injection molding the seal flat. Seals for magnetic tapes and the like of the prior art are generally extrusion molded and many such seals require a multistep process to produce both the annular band of the seal and the latch or locking mechanism.

Additional beneficial features of the present invention include providing the seals in a variety of colors by pigmenting the thermoplastic resin prior to molding.

Furthermore, the seal may be stabilized to ultraviolet (UV) light by compounding the thermoplastic resin with a UV stabilizer prior to molding. Other such additives for thermoplastic resins may also be compounded with resin prior to molding, e.g., antioxidants, and the like. The seals may also be provided with an identification insert for including addresses, company logos and the like on the outer surface of the seal. Moreover, the seals may be bar coded to provide the capability of being readable by optical scanners. This capability is of particular value for potential military use.

Referring now to the drawings, FIG. 1 illustrates a side view of one embodiment of the protective seal of the invention. The tab 10 of the overlapping end portion of the seal contains several narrow angled notches illustrated at 11 for easy gripping of the tab. The wide angle notch 12 on the top side or side away from the hub of the reel facilitates the lifting of the tab when the seal is locked. The serations 13 are angled away from the tab of the seal on the hub side of the seal to seat with corresponding serations on the opposite end portion of the seal in order to lock the seal about the reel. The angled sections 14 and 23 are dimensioned to matingly overlap the second end portion of the protective seal. The ribbed hook structure 15 which extends outwardly from the radially outer face of the annular band of the seal is dimensioned for hanging or suspending the reel for storage. The serations on the second end portion of the seal are illustrated at 18 and the side walls 16 and 17 bordering serations 18 are provided to receive and contain the first end portion when seating or mating the seration containing sections of the seal. The angled section 19 is dimensioned to matingly underlap the first end portion of the seal when locking the seal about the reel.

FIG. 2 shows a top view of the same embodiment of the protective seal of the invention illustrated in FIG. 1.

FIG. 3 shows a side view of the protective seal in the locked or sealed position. This figure illustrates the first end portion overlapping and locking with the second end portion of the protective seal.

Figure 4:
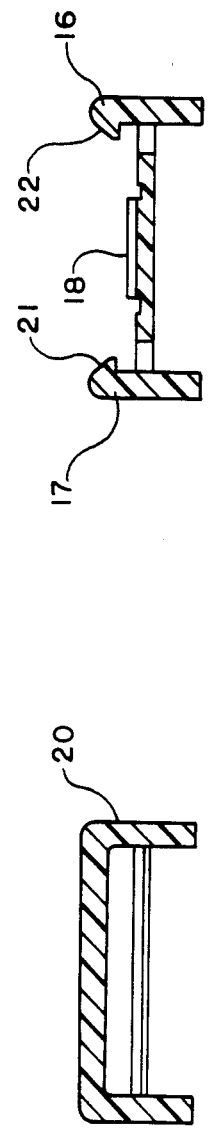
FIG. 4 is a sectional view of the protective seal in accordance with the present invention

FIG. 4 is a cross sectional view of the protective seal showing the side walls 20 which overlap the top portion of the magnetic tape or film to provide further protection.

Figure 5:
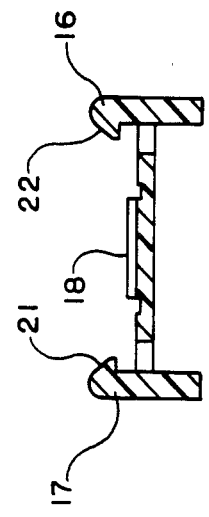
FIG. 5 is a sectional view of the underlapping end portion of the protective seal in accordance with the present invention.

FIG. 5 shows a cross section of the second end portion containing the serations 18 bordered by the side walls 17 and 16. This figure also shows the lips 21 and 22 on the side walls 16 and 17 which further facilitate the receiving and containing of the overlapping first end portion of the seal and to further secure the seal when locked around a particular reel.

Not only is the particular design of the seal of the invention critical to its utility, but also the nature of the plastic material from which it is prepared is critical to the effectiveness and durability of its ultimate end use. More specifically, the plastics material must have sufficient tensile strength and flexural modulus to allow for repeated flexing and unflexing of the tab 10 while locking and unlocking the seal without strain or fatigue. Also, the seal needs to be sufficiently stretchable along the length of the entire annular band of the seal to accommodate various reel dimensions and the take up of the particular magnetic tape or film on the reel. Also, as discussed previously, the seal must have sufficient impact strength in order that it does not break upon accidental dropping or banging of the reel during storage. Likewise, the hook structure requires sufficient dimensional stability to preclude creeping or failure of the hook under the relatively heavy weight of the suspended tape reel, i.e., the hook must be sufficiently rigid and strong to avoid gapping of the strip away from the encircled reel in the strip area immediately beneath the hook section.

The strip material must also have high resistance to environmental stress cracking. It has been discovered that high density or low density polypropylene and high density or low density polyethylene are preferred thermoplastic materials which provide the above properties in combination with the design of the seal. It is also been discovered that these materials are particularly useful for injection molding the seal flat. A seal produced from low density polyethylene by injection molding has demonstrated sufficient impact strength so as not to break when subjected to a three foot drop test.

While a preferred embodiment of the invention has been illustrated and described in detail with reference to a preferred embodiment above, it will be evident that various changes and modifications may be made to this preferred embodiment without departing from the scope or spirit of the invention. It is intended, therefore, that the invention be limited only by the scope of the claims which follow.

We claim:

1. A high impact strength protective seal of single piece design for reels of the type including a central hub and spaced flanges, said seal comprising an integrally molded locking means and an annular band of a high tensile strength and a high flexural modulus thermoplastic material adapted to be formed into a loop to sealingly encircle said reel wherein said annular band includes:

two surfaces, an outwardly facing surface and an inwardly facing surface relative to said central hub;

two ends, wherein a first end terminates with a tab having a plurality of narrow angle notches on both surfaces of said tab for gripping and pulling said tab;

a second end adapted to underlap said first end in a sealing relationship; and an integrally molded locking means, said locking means including a first sealing means on the inwardly facing surface of said first end spaced from said tab, and a second sealing means on the outwardly facing surface of said second end and spaced from the terminus of said second end to adjustably seat in a sealing relationship with said first sealing means said second sealing means further including two opposing parallel retaining means engaging the outer peripheral edge of said annular band and bordering said second sealing means to receive and contain said first end and said first sealing means upon adjustably seating with said second sealing means in a sealing relationship, said parallel retaining means comprise sidewalls integrally molded to the opposing outer peripheral edges of said annular band and bordering said second sealing means, wherein said sidewalls include an inwardly projecting lip to receive and contain said first end and said first sealing means in a sealing relationship and said first sealing means and said second sealing means each include a plurality of serrations angled away from the respective ends of said annular band.

2. The seal according to claim 1 wherein a portion of said annular band comprises a ribbed hook structure extending outwardly from the radially outwardly facing surface of said annular band.

3. The seal according to claim 1 wherein said first end portion further comprises a second wide angle notch spaced from said narrow angle notches on said outwardly facing surface of said annular band.

4. The seal according to claim 1 wherein said seal comprising said locking means and an annular band is injection molded flat to form a unitary protective seal and is produced from a thermoplastic material selected from the group consisting of high density polyethylene, low density polyethylene, high density polypropylene, low density polypropylene, polyvinylchloride and polyester.

5. The seal according to claim 4, wherein said thermoplastic material is low density polyethylene.

6. The seal according to claim 1 wherein said annular band comprises sidewalls projecting inwardly toward said hub of said reel.

7. The seal according to claim 28 wherein a portion of said band comprises an angled section spaced from said first sealing means of said first end and dimensioned to matingly receive and overlap said second end when sealing said reel by seating said first sealing means of said first end with said second sealing means of said second end, and wherein a section of said band spaced from said second end comprises an angled area, and, dimensioned to matingly underlap said first end upon sealing said seal about said reel.

8. The seal according the claim 1 wherein said thermoplastic material comprises on ultraviolet stabilizer to stabilize the seal to ultraviolet light and said thermoplastic material further comprises a pigment.

9. The seal according to claim 1 wherein said seal further comprises an identification insert on the outer surface of said annular band.

10. The seal according to claim 1 wherein said seal is bar coded to provide the seal readable by optical scanning devices.

11. A locking and releasing means for a protective seal for reels of the type including a central hub and spaced flanges said locking and releasing means integrally molded on the two ends of an annular band having two surfaces adapted to be formed into a loop to sealingly encircle said reel and comprising:

a first sealing means on the inwardly facing surface of a first end of said annular band spaced from the terminus of said first end and comprising a plurality of serrations angled away from said first end;

a tab on the terminus of said first end including a plurality of narrow angled notches on both surfaces of said tab for gripping and pulling said tab to release said locking means, and a second sealing means on the outwardly facing surface of the second end of said annular band and spaced from the terminus of said second end to adjustably seat in a sealing relationship with said first sealing means and comprising a plurality of serrations angled away from said second end, said second sealing means further including two opposing parallel retaining means engaging the outer peripheral edge of said annular band and bordering said second sealing means to receive and contain said first sealing means upon adjustably seating with said second sealing means in a sealing relationship.

12. The locking and releasing means according to claim 11 wherein said parallel retaining means comprise sidewalls integrally molded to the opposing outer peripheral edges of said annular band and bordering said second sealing means, wherein said sidewalls include an inwardly projecting lip to receive and contain said first end and said first sealing means in a sealing relationship.

13. The locking and releasing means according to claim 11 wherein said first end further comprises a second wide angle notch spaced from said narrow angle notches on said outwardly facing surface of said annular band.

14. The locking and releasing means according to claim 11 wherein a portion of said band comprises an angled section spaced from said first sealing means of said first end and dimensioned to matingly receive and overlap said second end when sealing said reel by seating said first sealing means on said first end with said said sealing means on said second end, and wherein a section of said band spaced from said second end comprises an angle, and is dimensioned to matingly underlap said first end upon sealing said seal around said reel.

15. The locking and releasing means according to claim 11 wherein said thermoplastic material comprises an ultraviolet stabilizer to stabilize the seal to ultraviolet light and said thermoplastic material further comprises a pigment.

16. The locking and releasing means according to claim 11 wherein said seal further comprises an identification insert on the outer surface of said annular band.

17. The locking and releasing means according to claim 11 wherein said seal is bar coded to provide the seal readable by optical scanning.

* * * * *